United States Patent [19]
Gauthier

[11] 3,955,263
[45] May 11, 1976

[54] METHOD AND DEVICE FOR CLOSING THE FASTENER OF A BELT, MORE PARTICULARLY A TEXTILE BELT

[75] Inventor: Maurice Gauthier, Hiersac, France

[73] Assignee: COFPA-Compagnie des Feutres pour Papeteries et des Tissus Industriels, Le Gond-Pontouvre, France

[22] Filed: Mar. 3, 1975

[21] Appl. No.: 554,546

[30] Foreign Application Priority Data
Mar. 4, 1974 France .............................. 74.07297

[52] U.S. Cl. .......................... 29/200 P; 29/207.5 R; 29/271
[51] Int. Cl.² ......................................... B23P 19/00
[58] Field of Search .................. 24/207, 33 C, 38 P; 29/271, 200 P, 200 B, 207.5 R, 207.5 SL, 408

[56] References Cited
UNITED STATES PATENTS

| | | | |
|---|---|---|---|
| 3,284,865 | 11/1966 | Burnham | 29/207.5 SL |
| 3,478,404 | 11/1969 | Plummer | 29/200 B |
| 3,613,176 | 10/1971 | Haythornthwaite | 24/207 |
| 3,722,052 | 3/1973 | Toti | 29/200 B |

*Primary Examiner*—James L. Jones, Jr.
*Attorney, Agent, or Firm*—Haseltine, Lake & Waters

[57] ABSTRACT

The invention concerns the fastening together of the ends of a belt. The closing of the fastener of a belt having fastening elements at each end is effected by means of two connecting straps fixed along each end and each comprising a guide ramp, a slide part having two grooves corresponding to the guide ramps and constituted by two parts separated by a space ensuring the progressive bringing together of the ends and the interlocking of the loops; a wire is inserted in the channel(s) defined by the interlocked loops in order to close the fastener. The invention applies to felt for paper-making and to conveyor belts in general.

14 Claims, 14 Drawing Figures

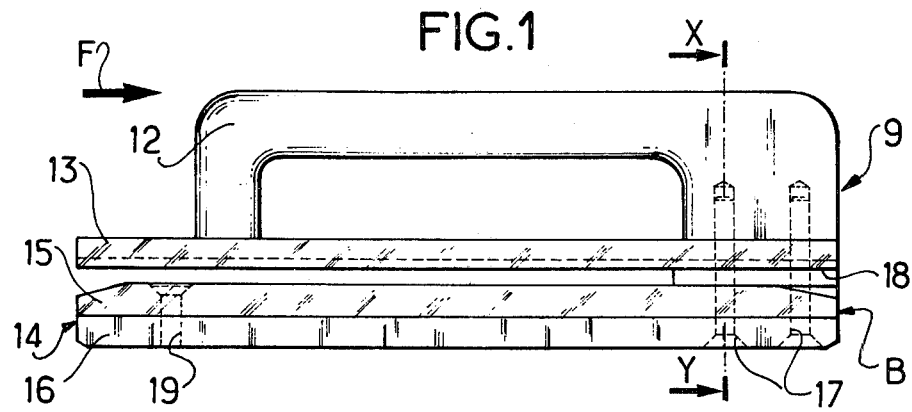
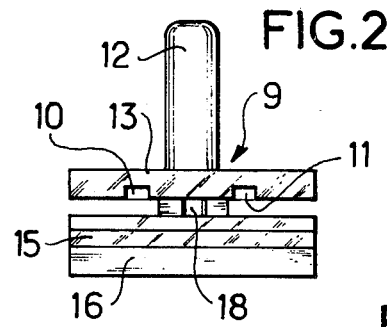 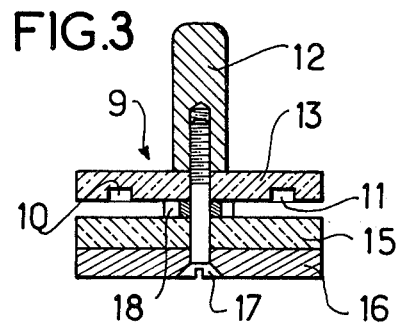
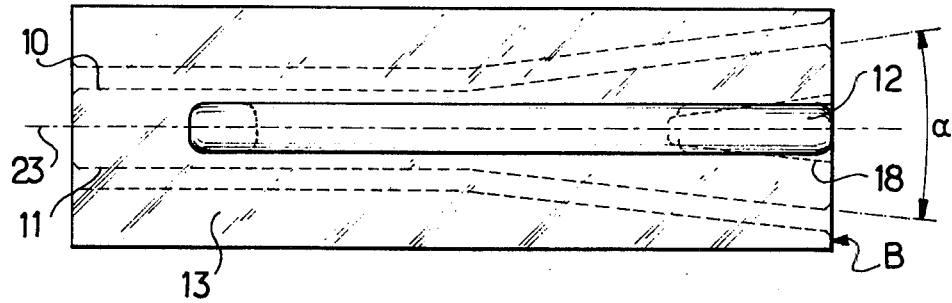
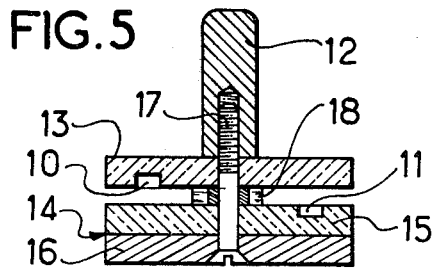

METHOD AND DEVICE FOR CLOSING THE FASTENER OF A BELT, MORE PARTICULARLY A TEXTILE BELT

The invention concerns the fastening together of the ends of a belt in general and more particularly of conveyor belts and more especially of textile belts used in paper-making machines for the drying of paper paste.

The invention aims at the fastening together of a belt which comprises two ends provided with fastening elements, the said fastening elements on one end of the belt interlocking with those of the other end to form at least one channel, the fastening being locked by means of a wire along the whole length of the said channel. The fastening elements are situated either directly on the belt, or on a strap added onto the belt and permanently fixed thereto; the said fastening elements are, for example, series of loops constituted either by threads of warp of the belt or by the said fixed-on strap, if the latter is woven, or by a plastic or metallic spiral whether the belt or the strap be woven or not, or by clips forming loops.

To fasten the belts together, the following method is generally used:

The edges of the fastener are brought closely together manually for the loops of each end to interlock with one another while ensuring that the assembly is correct and regular;

A wire is then inserted in each channel formed by the loops; there are, indeed, systems with loops forming one channel and systems with loops forming two channels.

When the length of the wire is great, as is the case with belts for paper-making machines, a wire inserter is used such as that which is the object of U.S. patent application Ser. No. 365,326, now U.S. Pat. No. 3,874,061 filed on 30th May, 1973 by the Applicant. Although the inserting of the wire(s) does not introduce any problem, it may nevertheless be easily understood that when the length of the fastener is great and the density of the loops is high, the result thereof is a long fastening time, rapid fatigue of the operator(s) and doubtful fastening quality.

Fasteners which close automatically and which consequently do not have the above-mentioned disadvantages relating to the actual fastening operation are also known; these are slide type fasteners. In such slide type fasteners, the fastening elements are metallic or plastic hooks, or else metallic or plastic spirals fixed to each end of the belt; a slide part runs astride the two sides of the slide type fastener on which it bears and closes the latter by its movement; the said slide part is, moreover, generally removable in order not to from an extra thickness on the belt. The slide type fastener is attractive, but is evidently possible only if the fastening elements, loops or hooks have certain characteristics inasmuch as concerns their shape and their dimensions and the slide part used is applicable only to slide type fasteners.

The present invention concerns a device for closing the fastener of a belt which comprises two ends provided with fastening elements such as series of loops, clips, spirals or the like, the fastening elements of one end of the belt interlocking in those of the other end to form at least one channel, the fastener being locked by a wire passing along the whole length of the channel.

The invention is characterized in that a guide strap is fixed along the whole length of each end of the belt, each guide strap comprising a guide ramp, that the said ends are brought progressively closer together by means of a slide part bearing on the said guide ramps and in that a wire is progressively inserted in each channel formed by the fastening elements interlocked before their leaving the slide part.

The device for closing and fastening is characterized in that it comprises two guide straps each fixed along the whole length of an end of the belt, each guide strap comprising, along its whole length a guide ramp parallel to the end of the belt and a slide part having an upper portion and a lower portion providing a space between them for the passing of the said belt and of the said guide straps, the said slide part comprising two longitudinal grooves open on the side adjacent to the said space and in each of which one of the said guide ramps passes, the said grooves being spaced apart from each other and being brought progressively closer together over a part of the length of the slide part until they become parallel to each other over another portion of the length of the slide part, their distance then being equal to that which separates the guide ramps when the fastening elements of the ends of the belt are interlocked in each other, the said interlocked loop fastening elements limiting at least one channel in which is inserted a retaining ring so that one end of the latter be constantly in the part of the length of the slide part in which the said grooves are parallel.

According to another characteristic of the invention, the slide part consists of a plane upper shoe and a plane lower shoe defining, between them, a plane space, the said shoes being connected together through a shim situated in the portion of the slide part where the said grooves are spaced out.

According to another characteristic of the invention, the slide part is composed by an upper plate and a lower plate separated transversally over a part of the length of the slide part by an intermediate shim, the assembly being joined together by bolts, the said upper and lower plates defining, between them, below and above the said intermediate shim, two intermediate spaces which are joined together to form a single intermediate plane space, in a portion of the length of the slide part.

According to another characteristic of the invention, the guide ramps are constituted by plastic spirals.

According to another characteristic of the invention, the guide straps are stitched to the belt, preferably with a chain stitch, in order to unstitch them rapidly after the closing operation of the fastener.

Other characteristics and advantages of the invention will become apparent from the description of examples of embodiments illustrated in the accompanying drawings in which:

FIG. 1 shows a slide part in an elevation view.

FIG. 2 shows a back view of the slide part in FIG. 1.

FIG. 3 shows a transversal cross-section of the slide part in FIG. 1.

FIG. 4 shows a top view of the slide part in FIG. 1.

FIG. 5 shows a transversal cross-section of a variant of the grooves of a slide part of the type in FIG. 1.

Figure 6:
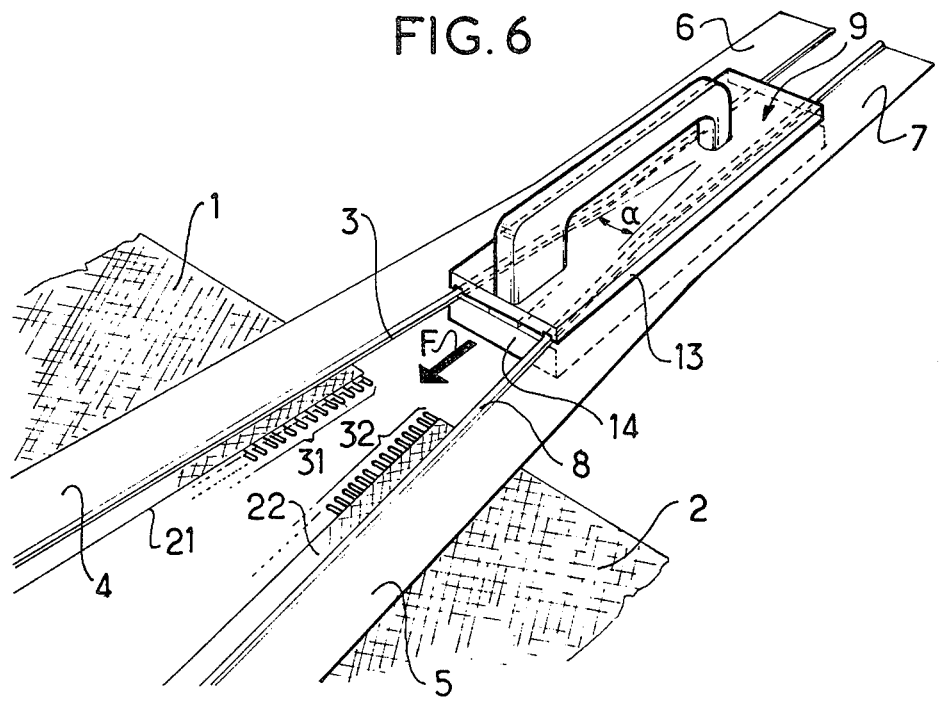
FIG. 6 shows a fastener closing device using the slide part in FIG. 1 before the closing of the fastener.

FIG. 1 shows an elevation view of an embodiment of a slide part consisting of two parts separated from each other by a space and of a handle 12; one of the parts is an upper shoe 13 and the other part is a lower shoe 14; the two shoes are plane and the space which separates them is a plane space; the shoes are kept separate by a shim 18 and are made fast together and with the handle 12 by screws 17, which cross through the shim 18. The upper shoe 13 is made of transparent material such as, for example, "Plexiglass"; the lower shoe 14 is constituted by a plate 15, also made of transparent material and by a reinforcing plate 16, which is metallic in order to impart rigidity to the slide part; the plate 15 and the reinforcing plate 16 are made fast together by means of screws 19. The lower shoe 14 may be a single preferably metallic part, the upper shoe 13 still being made of transparent material in order to enable the observing of the fastening of the textile belt; the arrow F shows the direction of movement of the slide part.

FIG. 2 is a rear view of the slide part in FIG. 1; the upper shoe 13 comprises two grooves 10 and 11, which extend along its whole length.

FIG. 3 is a cross-section view of the slide part in FIG. 1, that cross-section being taken in the plane xy of FIG. 1 and showing the fixing of the handle 12 and of the upper shoe 13 and lower shoe 14 by the screw 17.

FIG. 4 is a top view of the slide part according to FIG. 1; in that figure, the longitudinal shape of the grooves 10 and 11 will be observed; these grooves are spaced apart at the front end B of the slide part, over a part of the length of the slide part, on the same side as the shim 18 and are brought together progressively, forming an angle $\alpha$ between them, to become parallel on another part of the length of the slide part; the grooves are preferably parallel over at least half the length of the slide part and symmetrical in relation to the longitudinal axis 23 of the slide part.

FIG. 5 shows a cross-section xy of a slide part of the same type as that in FIG. 1, but comprising a groove on each of the lower and upper shoes, the slide part not otherwise modified, this variant enables an identical production of the upper shoe 13 and of the plate 15, more particularly if these two parts are made from the same transparent material and with the same thickness.

FIG. 6 shows a fastener closing device using a slide part 9 of the same type as that shown in FIG. 1; this figure 6 shows the two ends of 1 and 2 of a textile belt used in a paper-making machine, whose fastening element, situated at the edge 21, 22 of each end is constituted by a series of loops 31 for the end 1 and a series of loops 32 for the end 2, the said loops being formed by the threads of the warp of the said textile belt. A guide strap 4 is fixed to the end 1 and a guide strap 5 is fixed to the end 2; each guide strap is fixed parallel to the edge of the corresponding end of the textile belt; the two guide straps are fixed on the same side of the textile belt at a distance from the edge such that the edge of a guide strap which is the nearest to the edge of the corresponding end of the textile belt be preferably at a distance between 0.5 and 5 centimeters. The guide straps 4 and 5 extend at least beyond one side of the textile belt and constitute two free ends 6 and 7 which make the inserting of the slide part 9 easier. Each guide strap 6, 7 comprises a guide ramp 3, 8 respectively parallel to the edge of the corresponding end of the textile belt; the guide ramp can, to great advantage, be at the end edge of the guide strap which is the nearest to the end edge of the textile belt and be constituted, for example, either by a bead fixed to the guide strap, or by a plastic spiral of a slide type fastener. The guide straps are preferably woven and sewn on the textile belt; they can be impregnated or otherwise; the guide straps can also be plastic belts. The guide ramps can also be sewn cords or, even, plastic sectional bars moulded directly onto the guide straps when these latter are made of plastic material or woven. The fixing of the guide straps 4 and 5 on the textile belt is effected preferably by chain stitches, this making it possible to unstitch them very easily and to remove them after the fastening of the textile belt if this is necessary; the fixing of the guide straps can also be effected by conventional stitches, by clips, by rivets, by cementing, by thermo-welding and, in a general way, by any suitable means. The operation of the fastener closing device is as follows: the free ends 6 and 7 of the guide straps 4 and 5 are inserted in the slide part 9, in the space between the upper shoe 13 and the lower shoe 14 on the same side as the front end B of the slide part where the grooves 10 and 11 are not parellel, the guide ramps 3 and 8 each being engaged in a groove; the slide part is then moved in the direction of the arrow F and the ends 1 and 2 of the textile belt fast with the guide straps 4 and 5 engage with them in the slide part 9 and, due to the shape of the grooves 10 and 11, these ends are brought together progressively until the loops 31 and 32 of the ends 1 and 2 begin to interlock together; at that point, the guide ramps 3 and 8 for the guide straps become parallel to each other, since they are guided by the grooves 10 and 11; the slide part continuing its movement, the loops remain interlocked together, the edges 21 and 22 of the ends of the textile belt also remain parallel; as soon as the loops 31 and 32 interlocking together are brought to the output of the slide part, a wire is inserted in the channel formed by the loops interlocking together.

Figure 7:
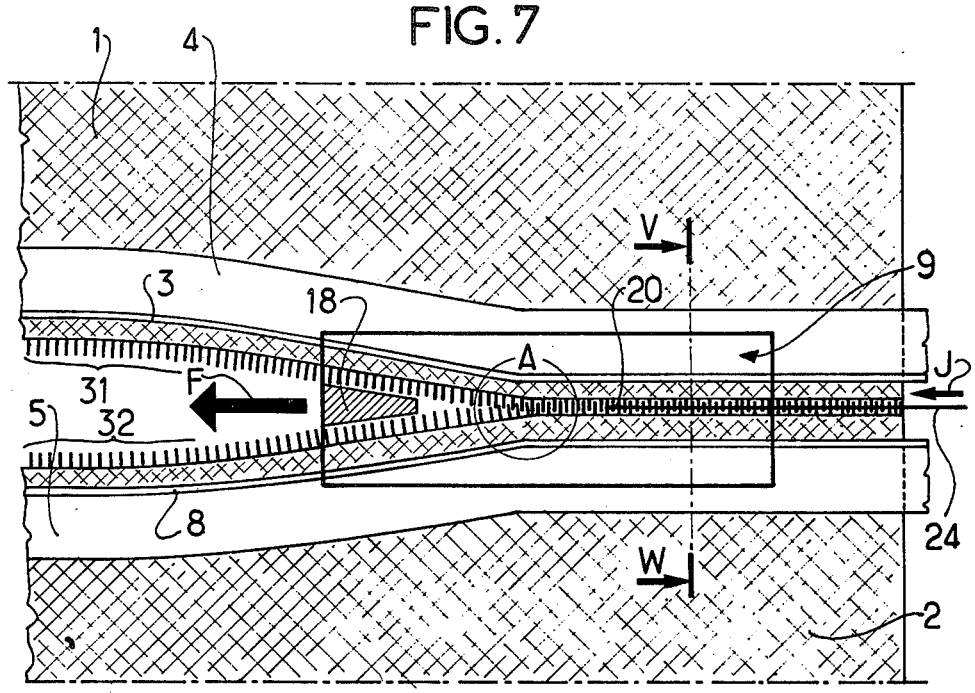
FIG. 7 shows a fastener of a belt being closed.
Figure 8A:
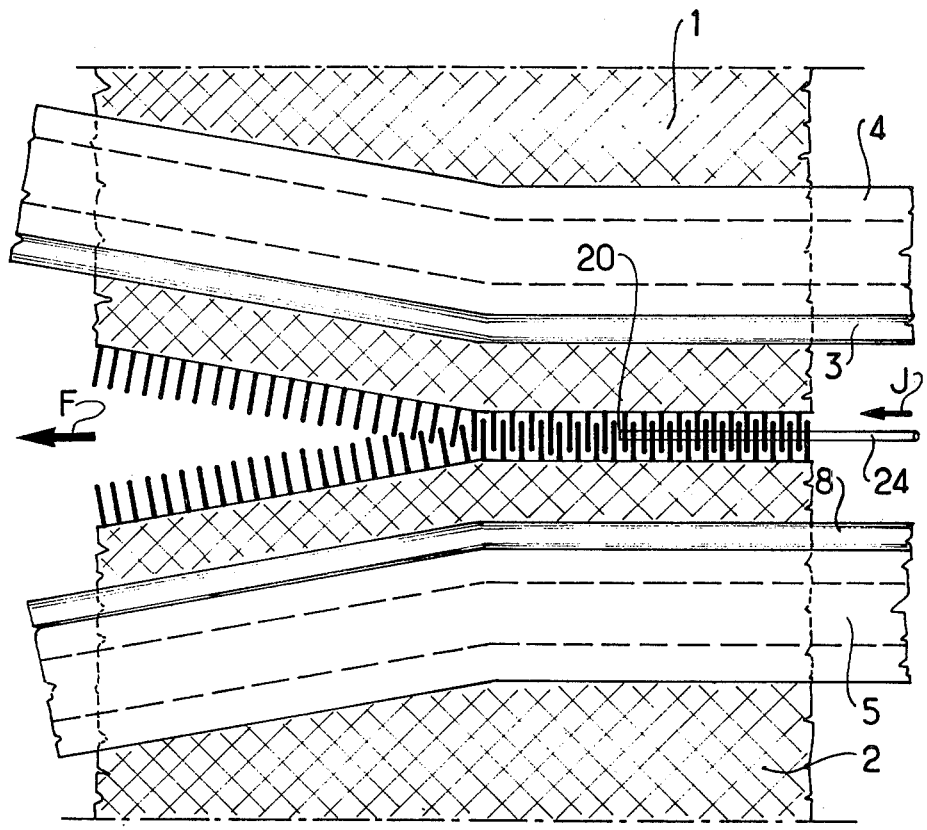
FIG. 8a shows a large scale detail of a fastener in the closing zone with locking by a wire.

FIG. 7 shows a fastener being closed; a wire 24 is inserted in the direction shown by the arrow J into the interlocking loops and its end 20 is kept constantly in the zone where the grooves 10 and 11 of the slide part 9 are parallel, during the advance of the slide part in the direction of the arrow F; the closing zone of the fastener which is situated in the circle A is illustrated on a larger scale in FIG. 8a, on which the slide part 9 has not been shown, for clearness' sake in the drawing.

Figure 9:
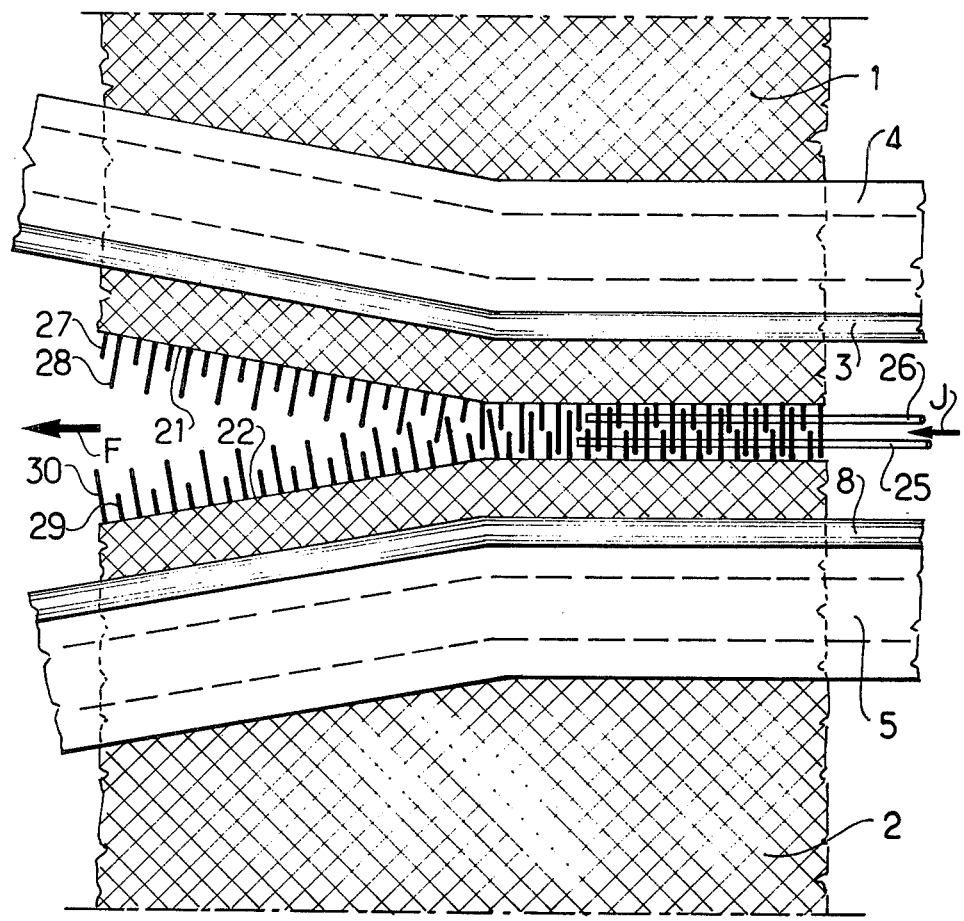
FIG. 9 shows a large scale detail of a fastener in the closing zone, with locking by two wires.

FIG. 9 shows, on a large scale, the closing zone of a fastener with two wires 25 and 26, the ends of the textile belt each comprising alternately small and large loops, such as the small loops 27 and the large loops 28 for the end 1 and the small loops 29 and the large loops 30 for the end 2; in relation to the preceding figures, nothing is changed in the guide straps or in the slide part, since the dimensions concerned are exclusively those of the loops at the edges 21, 22 of the ends 1 and 2 of the textile belt. The angle $\alpha$ formed by the two grooves is all the greater as the loops of the series of loops are close together. It will be easily understood, by means of the FIGS. 8a and 9 that the distance which separates the guide ramps 3 and 8 from the fastener belts 4 and 5 when the closing is effected, must be equal to the distance which separates the grooves 10 and 11 from the slide part, in the length of the slide part where the said grooves are parallel and that the observing of the locking in the closing zone is possible due to the transparency of the upper shoe 13.

Figure 8B:
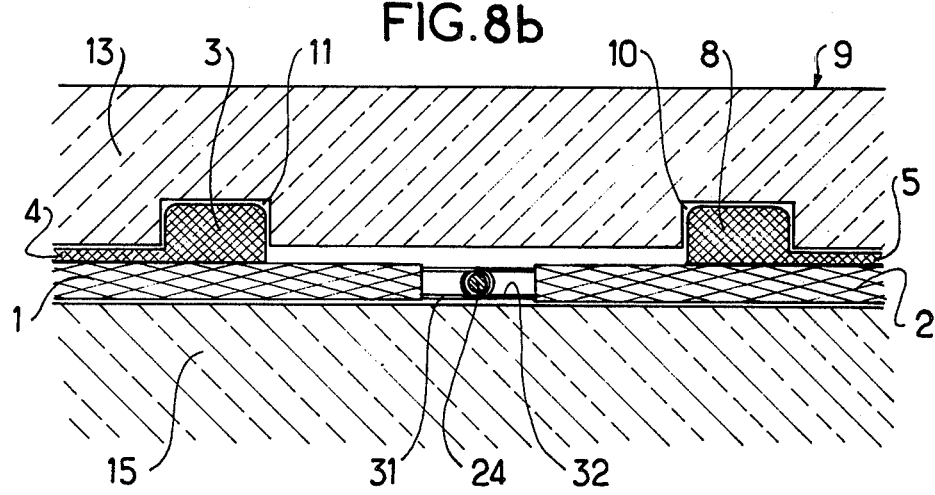
FIG. 8b shows a cross-section of the fastener after closing and locking by a wire.

FIG. 8b shows a view of the fastener and of the slide part in the cross-section v w in FIG. 7. The upper shoe 13 and lower shoe 14 being plane, the space between them is also plane, so that the ends 1 and 2 of the textile belt are situated in the plane corresponding to the said space; the closing of the fastener is therefore effected in a plane by progressive bringing together of the two ends 1 and 2 under the action of the slide part 9. This method of operation is perfectly suitable for textile belts which are sufficiently flexible to be deformed in their plane and which can be deformed in the zone where the grooves 10 and 11 form an angle of $\alpha$ between them. The slide part shown in FIG. 10 makes it possible to effect the joining of a textile belt while keeping the ends of the latter parallel during the whole closing operation; that slide part will therefore be used in preference to that shown in FIG. 1 in the case of textile belts which are not easily deformable in their plane but which are deformable in a direction perpendicular to their plane. The slide part shown in a longitudinal cross-section in FIG. 10, in a cross-section a b of FIG. 10 in FIG. 11 and in a top view in FIG. 12, comprises two parts; an upper plate 33 and a lower plate 34 connected together by bolts 35. The two plates 33 and 34 are separated transversely, at the front portion of the slide part, by an intermediate shim 36 through which the bolts 35 cross.

At the front end B of the slide part, the lower plate 34 comprises a thin part 39 and a thick part 40 and the upper plate 33 comprises a thin part 41 and a thick part 42; the two parts are separated by a space which is constituted by two intermediate spaces 43, 44 so as to allow the passing of the ends 1 and 2 of the textile belt provided with its two guide straps. These intermediate spaces exist all along the length of the slide part and are connected together preferably before the middle of the length of the slide part, where they then form a single intermediate space 52 which is plane; for that purpose, the faces 45 and 46 of the upper plate 33 come progressively together before the middle of the length of the slide part from the front end B of the slide part and the same applies for the faces 47 and 48 of the lower plate 34; of course, the faces adjacent each other, 45 and 47 on the one hand 46 and on the other hand 48, have the same profile so that their spacing apart may remain constant. Preferably, the faces 45 and 46 are brought together at half the distance which separates them at the front end B of the slide part; likewise, the faces 47 and 48 are brought together at half the distance which separates them at the front end B. The upper face 49 and lower face 50 of the intermediate shim 36 have respectively the same profile as the faces 45 and 48 adjacent to each other. The upper plate 33 comprises, all along its length, two parallel grooves 37 and 38 in which the guide ramps 3 and 8 of the connecting belts move. A handle 51 is fixed on the upper plate of the slide part which moves in the direction shown by the arrow F.

Figure 10:
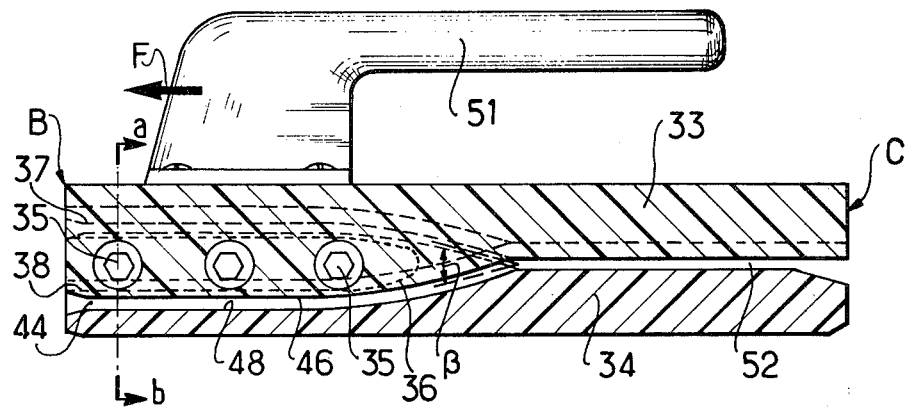
FIG. 10 shows a longitudinal cross-section of a variant of a slide part.
Figure 11:
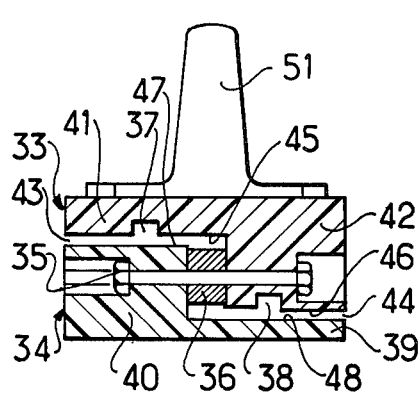
FIG. 11 shows a transversal cross-section of a slide part according to FIG. 10.
Figure 12:
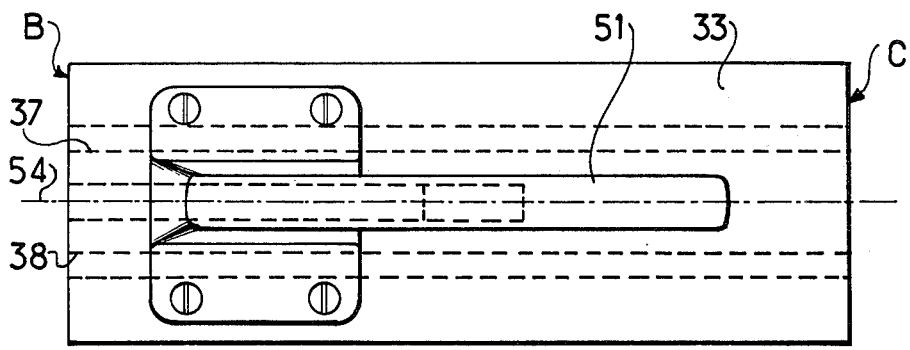
FIG. 12 is a top view of the slide part according to FIG. 10.

FIG. 12 shows a top view of the slide part according to FIG. 10; it will be observed in that figure that the grooves are in parallel planes which are equidistant from the longitudinal axis 54 of the slide part.

The operation of the slide part is as follows: the free ends 6 and 7 of the guide straps 4 and 5 are inserted as in FIG. 6 respectively in the intermediate spaces 43 and 44, on the same side as the front end B of the slide part, the guide ramps 3 and 8 coming in the grooves 37 and 38; when the slide part advances, the ends 1 and 2 of the textile belt enter the intermediate spaces and the loops of each end, which are at the bottom of the intermediate spaces, end up one above another and separated by the intermediate shim 36. When the slide part advances, the ends 1 and 2 are brought together when the intermediate spaces 43 and 44 merge to form a single intermediate space 52. The intermediate spaces form, before they are brought together, an angle $\beta$ which enables the interweaving of the loops with one another; this angle must be all the greater as the series of loops 31 and 32 are tight, but a great angle $\beta$ is suitable for series of loops which are not very tight. As in the case of the slide part according to FIGS. 1, 2, 3, 4, the fastener is closed by means of a wire inserted in each channel formed by the series of loops 31 and 32, since it is possible to have, on each edge of the ends of the textile belt, either identical loops or alternately small and large loops which then define two channels. The wire is inserted on the same side as the rear end C of the slide part in FIG. 10, whose upper plate 33 is preferably made of a transparent material. The end of the wire is always kept in the intermediate space 52 between the rear end C of the slide part and the connecting zone of the intermediate spaces 33 and 34.

Figure 13:
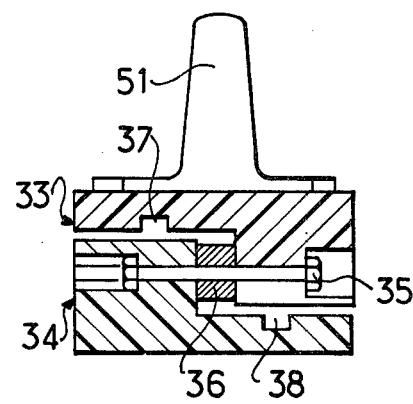
FIG. 13 shows a transversal cross-section of a variant of the grooves of a slide part according to FIG. 10.

In the variant of the slide part shown in a cross-section in FIG. 13, it is possible to have a groove in each plate; the slide part being of the same type as that in FIG. 10, but with the groove 38 in the lower plate 34, so that both the upper and the lower plate are identical, this making it possible to manufacture a single type of plate.

The operation of the slide parts according to the variants in FIGS. 5 and 13 is identical to that of the slide parts in FIGS. 1 and 10, but of course, the guide straps 4 and 5 are fixed each on a different side of the textile belt on the ends 1 and 2 of the said textile belt. Whatever the type of slide part used may be, the distance between the guide ramps 3 and 8 of the guide straps must be the same, that is, the distance between the grooves, when they are parallel, is the same in the various variants. In general, a slide part is used and the guide straps are fixed as a function of the said slide part.

It is very easy, with any type of slide part, to come back to a former position during the operation for the closing of the fastener if, for any reason, the loops are not correctly interlocked, then to advance again to effect the closing of the fastener. When the closing of the fastener of the textile belt is ended, it is possible, if necessary to remove the guide straps, which will then preferably have been stitched, more particularly with a chain stitch, for all that is needed, in that case, is to pull on the ends of the stitch threads; the textile belt thus closed no longer has any rough parts which could cause defects on the paper paste.

It must be understood that the invention is not limited to the embodiments described and illustrated and, without going beyond the scope of the invention, certain means can be replaced by equivalent means.

What is claimed is:

1. Device for closing the fastener of a belt, more particularly a textile belt, which comprises two ends provided with fastening elements such as series of loops, clips, spirals or the like, the fastening elements of one end of the belt interlocking with those of the other end to form at least one channel, the fastening being locked by a wire passing along the whole length of the channel, comprising a guide strap detachably fixed along the whole length of each end of the belt, each guide strap comprising a guide ramp and a slide part for bringing the said ends progressively closer together, the said slide part bearing on the said guide ramps, a wire being progressively inserted in each channel formed by the fastening elements interlocked before their leaving the slide part, the said guide straps being removed after the fastening of the belt.

2. Device according to claim 1, characterized in that it comprises two guide straps (4, 5) each fixed along the whole length of an end (1, 2) of the said belt, each guide strap (4,5) comprising, along its whole length a guide ramp 3, 8) parallel to the end of the belt and a slide part having an upper portion and a lower portion providing a space between them for the passing of the said belt and of the said guide straps, the said slide part having two longitudinal grooves (10,11,37,38), open on the same side as the said space and in each of which one of the said guide ramps (3,8) passes, the said grooves being spaced apart from each other and being brought progressively closer together over a part of the length of the slide part until they become parallel to each other over another portion of the length of the slide part, their distance then being equal to that which separates the guide ramps when the fastening elements of the ends of the belt are interlocked and define at least one channel in which is inserted a wire (24,25,26) so that one end (20) of the latter is constantly in the portion of the length of the slide part in which the said grooves are parallel.

3. Device for closing the fastener of a belt according to claim 2, characterized in that the slide part consists of a plane upper shoe and (13) a plane lower shoe (14) defining, between them, a plane space, the said shoes being connected together through a shim (18) situated in the portion of the slide part where the said grooves come closer together.

4. Device for closing the fastener of a belt, according to claim 3, characterized in that the said upper shoe (13) has the said grooves (10, 11).

5. Device for closing the fastener of a belt, according to claim 3, characterized in that the said upper and lower shoes each has a groove.

6. Device for closing the fastener of a belt according to claim 2, characterized in that the slide part is composed by an upper plate (33) and a lower plate (34) separated transversally over a part of the length of the slide part by an intermediate shim (36), the whole being joined together by bolts (35), the said upper and lower plates defining, between them, below and above the said intermediate shim, two intermediate spaces (43), (44) which are joined together to form a single intermediate plane space (52), in a portion of the length of the slide part.

7. Device for closing the fastener of a belt, according to claim 6, characterized in that the said upper plate (33) has two grooves (37, 38) each situated in a plane perpendicular to the said plane of the said single intermediate space (52).

8. Device for closing the fastener of a belt, according to claim 2, characterized in that the guide ramps (3, 8) are constituted by plastic spirals.

9. Device for closing the fastener of a belt, according to claim 2, characterized in that the said guide straps are textile belts.

10. Device for closing the fastener of a belt, according to claim 2, characterized in that the said guide straps are made of plastic material.

11. Device for closing the fastener of a belt according to claim 9, characterized in that the said guide ramps are textile cords stitched to the edges of the said guide straps.

12. Device for closing the fastener of a loop according to claim 10, characterized in that the said guide ramps are plastic cords moulded directly to the edges of the said guide straps.

13. Device for closing the fastener of a belt according to claim 2, characterized in that the guide straps are sewn with chain stitches enabling them to be removed rapidly after the closing of the fastener.

14. Device for closing the fastener of a belt according to claim 2, characterized in that at least the upper part is made of transparent material.

* * * * *